United States Patent
Theiss et al.

(10) Patent No.: US 6,937,142 B2
(45) Date of Patent: Aug. 30, 2005

(54) METHOD FOR THE CLASSIFICATION OF AN OCCUPANCY STATUS OF A VEHICLE SEAT

(75) Inventors: Christian Theiss, Sankt Vith (BE); Marc Schifflers, Lontzen (BE); Patrick Di Mario Cola, Fontoy (FR)

(73) Assignee: IEE International Electronics & Engineering S.A., Echternach (LU)

( * ) Notice: Subject to any disclaimer, the term of this patent is extended or adjusted under 35 U.S.C. 154(b) by 0 days.

(21) Appl. No.: 10/489,400

(22) PCT Filed: Aug. 31, 2002

(86) PCT No.: PCT/EP02/09758
§ 371 (c)(1),
(2), (4) Date: Jul. 28, 2004

(87) PCT Pub. No.: WO03/022620
PCT Pub. Date: Mar. 20, 2003

(65) Prior Publication Data
US 2005/0015188 A1 Jan. 20, 2005

(30) Foreign Application Priority Data
Sep. 11, 2001 (LU) ................................................ 90830

(51) Int. Cl.⁷ ................................................ B60Q 1/00
(52) U.S. Cl. .......................... 340/436; 280/735; 701/45
(58) Field of Search .............................. 340/425.5, 438, 340/439, 436, 870.16; 280/734, 735; 701/45, 29; 711/103, 104, 105, 165; 713/330, 340; 714/24; 180/268

(56) References Cited

U.S. PATENT DOCUMENTS

| | | | | |
|---|---|---|---|---|
| 4,258,421 A | * | 3/1981 | Juhasz et al. | 701/35 |
| 5,113,185 A | * | 5/1992 | Ichikawa | 340/995.27 |
| 6,438,472 B1 | * | 8/2002 | Tano et al. | 701/35 |
| 6,559,555 B1 | * | 5/2003 | Saitou et al. | 307/10.1 |
| 6,587,756 B2 | * | 7/2003 | Moriguchi et al. | 701/1 |
| 6,694,483 B1 | * | 2/2004 | Nagata | 715/502 |

FOREIGN PATENT DOCUMENTS

| | | |
|---|---|---|
| DE | 198 02 581 A1 | 8/1999 |
| EP | 0 881 132 A1 | 4/1998 |
| WO | WO 98/58821 | 12/1998 |
| WO | WO 99/38731 | 8/1999 |

\* cited by examiner

*Primary Examiner*—Brent A. Swarthout
(74) *Attorney, Agent, or Firm*—McCormick, Paulding & Huber LLP

(57) ABSTRACT

A method for the classification of an occupancy status of a vehicle seat, where occupancy profiles from an occupancy sensor are recorded and evaluated and the classification of the actual occupancy status is determined. The method includes, when the system power is turned off, storing the last determined class and the last recorded profile into a non-volatile memory; when the system power is turned on, comparing the first recorded profile with the profile stored into the non-volatile memory; and if the likeness of the first recorded profile and the profile stored in the non-volatile memory exceeds a specific threshold, setting the actual class to equal the class stored into the non-volatile memory.

5 Claims, 1 Drawing Sheet

METHOD FOR THE CLASSIFICATION OF AN OCCUPANCY STATUS OF A VEHICLE SEAT

CROSS REFERENCE TO RELATED APPLICATIONS

This application is entitled to the benefit of and incorporates by reference in their entireties essential subject matter disclosed in International Application No. PCT/EP02/09758 filed on Aug. 31,2002 and Luxembourg Patent Application No. 90 830 filed on Sep. 11, 2001.

FIELD OF THE INVENTION

This invention generally relates to automotive occupancy sensor systems and methods of operation to determine the presence and/or the position of an object or a passenger in a seat, and to classify it by type or nature in order to provide an occupancy state or condition signal for use with a safety restraint system control. The present invention more specifically relates to a method for the classification of an occupancy status of a vehicle seat based on several parameters relating to an occupation status of a vehicle seat.

BACKGROUND OF THE INVENTION

In order to protect the lives of passengers during a traffic accident, modern vehicles are generally fitted with a protection system comprising several airbags and seat belt pretensioners, which are used to absorb the energy of a passenger released during the collision due to the accident. It is clear that such systems are even more effective when they are better adapted to the specific requirements of each passenger, i.e. to the weight and/or the size of the passenger. That is why microprocessor-controlled protection systems have been designed which provide several operational modes, allowing for example an adaptation of the instant at which airbags are deployed, the volume to which the airbags are inflated, the instant at which safety belts are released after the collision, etc, as a function of the stature of the passenger and the orientation of the passenger on the seat.

In order to enable the control microprocessor to select the optimum operational mode for a given seat occupancy status, it is therefore necessary to detect one or several parameters characterizing the occupancy status of the seat and to classify the occupancy into one of several classes, each of which is associated to a specific operational mode of the restraint system.

The detection of the occupancy parameters is commonly achieved by seat occupancy sensors, which comprise a plurality of pressure sensors distributed over the surface of the seat. The pressure sensors comprise pressure sensitive resistors, i.e. the resistance of these pressure sensors changes with the pressure applied on the sensor. The reading of the resistance values of the individual pressure sensors thus gives an indication on the pressure acting on each cell and accordingly can be related to the weight acting on the seat. Furthermore the distribution of the pressure values over the surface of the seat can be related to the size or the form of a person or an object occupying the seat.

In a very simple method for controlling the restraint system, the occupancy status is repeatedly monitored by means of one or more specific parameters of the occupancy detector, and an actual occupancy class is associated to the measured parameter. This actual occupancy class is then directly used by the microprocessor for selecting the adequate operational mode of the restraint system. Unfortunately a passenger often changes its position on the seat, thereby shifting its weight respectively its center of weight. Each movement will change the readings on the different pressure sensors so that the classification will vary arbitrarily with time.

In order to dampen the arbitrary variations of the classification, the actual class parameter can be stored into a buffer comprising several previously determined classes and a filtered class can be set to the average value of the individual stored classes. While such a filtering provides an improved classification result, this method is still not reliable enough.

Other methods are based on an evaluation of the quality of the actually recorded pressure profile of the occupancy sensor. In these methods, the actually determined class resp. the actually determined parameters are used for the determination of a filtered class only if the profile quality exceeds a specific threshold. A method of this kind is e.g. disclosed in WO99/38731. With such a method, the accuracy of the classification increases with time such that after a certain time following the system reset during ignition of the car, the control module of a secondary restraint system will be fed with a high accuracy parameter, enabling the selection of an optimum deployment modus for the present occupancy status.

However during the initialization period, i.e. immediately following the ignition of the engine, the classification of the actual occupancy status may be rather inaccurate due to the reduced number of recorded and evaluated profiles. This problem is aggravated, if the passenger does not take an optimal position on the seat, which would permit to record high quality profiles.

OBJECTS AND SUMMARY OF THE INVENTION

The object of the present invention is to provide an improved method for the classification of an occupancy status of a vehicle seat.

In order to overcome the above-mentioned problems, the present invention provides a new method for the classification of an occupancy status of a vehicle seat, said method comprising the recording and evaluation of occupancy profiles from an occupancy sensor and the determination of a classification of the actual occupancy status. According to the invention, the method comprises the steps of
a) on system power off, storing the last determined class and the last recorded profile into a non-volatile memory;
b) on system power on, comparing the first recorded profile with the profile stored into said memory; and
c) if the likeness of said first recorded profile and said profile stored in said memory exceeds a specific threshold, setting the actual output class to equal said class stored into said memory.

With the present method, if at power on or system start-up the first recorded profile is similar to the stored profile, the classification module immediately delivers a high confidence class to the restraint system control module. It follows, that after a stop of the vehicle, e.g. at a gas station, the classification module immediately delivers the class which has been determined and continuously improved before the stop. Accordingly the secondary restraint system can be immediately switched to a deployment modus which is very well adapted to the occupancy situation.

If at system start-up, the first recorded profile is very different from the stored profile, the system concludes that the passenger has changed or moved and the last determined class is not necessarily restored. In this case the output class has to be continuously improved by suitable filtering in order to increase the accuracy and the confidence level of the classification.

It should be noted, that for the present invention, an occupancy profile should be understood as any parameter reading from the occupancy sensor, which is correlated to the actual occupancy status. In the case of an occupancy sensor having several detection cells distributed over a seating surface of the seat, the profile can comprise a pattern of individual switching conditions of the different cells, e.g. a pattern of individually measured pressures in a pressure sensitive sensor with several pressure sensitive cells. In this case the comparison between the first recorded profile and the stored profile can be achieved by individually comparing the switching conditions of the respective cells of the profiles. The number of cells having the same or a similar switching condition can then be used as a parameter for assessing the likeness of the two profiles.

If the classification method uses a filter algorithm, in which several subsequently determined classes or several subsequently recorded profiles are stored in a buffer, step a) preferably further comprises storing the content of said buffer in said non-volatile memory and said step c) preferably further comprises restoring said content stored in said memory into said buffer. The restoring of the entire buffer enables the filter algorithm to immediately work in steady conditions.

Since the execution of the above described steps is only useful when the seat is actually occupied, the method preferably further comprises the step of setting a flag indicative of an occupancy of the seat, wherein said steps a) to c) are executed only if said flag is set.

It should be noted that the present method can be combined with any possible evaluation method for determining e.g. the weight or size of a passenger as well as with any method for plotting a filtered class out of a set of subsequently determined classes. Independent of the chosen combination, the present method provides an increased confidence level for the output class in the initial phase of the algorithm, i.e. after the ignition of the vehicle.

DETAILED DESCRIPTION OF THE INVENTION

Figure 1:
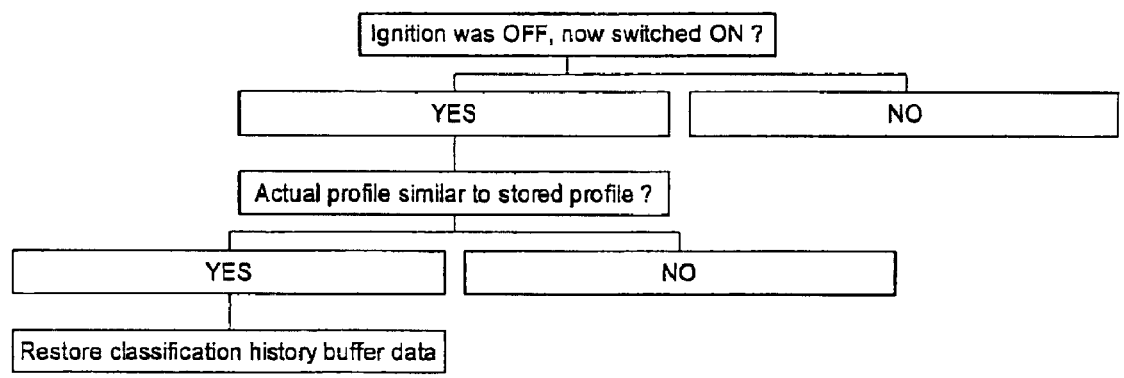
FIG. 1 illustrates a flow chart for the initialization phase of a method for classification, in accordance with one embodiment of the present invention.

The present invention will be more apparent from the following description of a not limiting embodiment with reference to the attached FIG. 1, which shows a flow chart of the initialization phase of a method for classification. It should be noted that the utilization of method is not limited to a specific sensor type or a specific parameter to be determined.

When the ignition switch is turned off, the system stores the last profile and the buffer parameters (classification filtering buffer, last recorded profile and class, . . . ) in a non-volatile memory. When ignition is turned on again, the smart buffer compares the last stored profile with the first incoming profile. If the likeness of those profiles is high, the system starts up with the stored buffer parameters.

The aim of a classification filtering module is to give the final classification a confidence level in function of the classification history and the characteristics of the actual profile. A classification that was assumed as good and reliable should be frozen when the incoming profile doesn't allow a reliable classification (low profile quality or bad sitting position). The smart buffer part of this module should, after a system reset, restore the last stored buffer state before the reset if the actual profile has a high likeness with the last stored profile before the reset.

The first time the algorithm runs after a system reset, the smart buffer algorithm has to be executed before the classification filtering algorithm is executed. It can e.g. comprise the following steps:

Compare the actual profile (e.g. a digitized pressure value profile (DPV) of a pressure sensitive occupancy sensor) as coming from the sensor to the last stored DPV profile before the system reset. The comparison can be executed cell by cell.

Count the cells where the difference of DPV before/after system reset is smaller than a first threshold, i.e. count the cells exhibiting a similar switching condition.

If the counter from the previous step is greater than a predetermined second threshold given by the calibration, i.e. if the actual profile is similar to the stored profile, restore the classification history buffer, the previous confidence level and buffered class, and all other variables that have to remain between each turn in the classification filtering algorithm.

What is claimed is:

1. A method for the classification of an occupancy status of a vehicle seat, said method comprising the recording and evaluation of occupancy profiles from an occupancy sensor and the determination of a class associated to the actual occupancy status, said method further comprising the steps of a) on system power off, storing the last determined class and the last recorded profile into a non-volatile memory;

b) on system power on, comparing the first recorded profile with the profile stored into said memory; and c) if a likeness of said first recorded profile and said profile stored in said memory exceeds a specific threshold, setting the actual output class to equal said class stored in said memory.

2. The method according to claim 1, wherein several subsequently determined classes are stored in a buffer, wherein step a) further comprises storing the content of said buffer in said non-volatile memory and wherein step c) further comprises restoring said content stored in said memory into said buffer.

3. The method according to claim 1, wherein several subsequently recorded profiles are stored in a buffer, wherein step a) further comprises storing the content of said buffer in said non-volatile memory and wherein said step c) further comprises restoring said content stored in said memory into said buffer.

4. The method according to claim 2, wherein several subsequently recorded profiles are stored in a buffer, wherein step a) further comprises storing the content of said buffer in said non-volatile memory and wherein said step c) further comprises restoring said content stored in said memory into said buffer.

5. The method according to claim 1, further comprising the step of setting a flag indicative of an occupancy of the seat, wherein said steps a) to c) are executed only if said flag is set.

* * * * *